United States Patent [19]
Adolph et al.

[11] Patent Number: 5,959,539
[45] Date of Patent: Sep. 28, 1999

[54] APPARATUS FOR THE REMOTE CONTROL OF ELECTRONIC DEVICES WITH KEY ALLOCATION

[75] Inventors: Dirk Adolph, Ronnenberg; Carsten Herpel, Hannover; Ingo Huetter, Celle, all of Germany

[73] Assignee: Deutsche Thomson-Brandt GmbH, Villingen-Schwenningen, Germany

[21] Appl. No.: 08/763,561

[22] Filed: Dec. 10, 1996

[30] Foreign Application Priority Data

Dec. 23, 1995 [DE] Germany .......................... 195 48 776

[51] Int. Cl.$^6$ .................................................. H04Q 1/00
[52] U.S. Cl. ............................... 340/825.07; 340/825.24; 340/825.54; 340/825.56
[58] Field of Search ........................ 370/825.07, 825.08, 370/825.22, 825.24, 825.25, 825.54, 825.69, 825.72, 825.56, 825.57; 348/734; 349/143; 395/829; 710/9

[56] References Cited

U.S. PATENT DOCUMENTS

| | | | |
|---|---|---|---|
| 4,566,034 | 1/1986 | Harger et al. | 348/734 |
| 4,728,949 | 3/1988 | Platte et al. | 340/825.57 |
| 4,746,919 | 5/1988 | Reitmeier | 340/826.56 |
| 4,764,981 | 8/1988 | Miyahara et al. | 359/143 |
| 4,773,005 | 9/1988 | Sullivan | 395/829 |
| 4,825,209 | 4/1989 | Sasaki et al. | 340/825.72 |
| 5,351,041 | 9/1994 | Ikata | 340/825.24 |
| 5,621,484 | 4/1997 | Cotty | 348/734 |

FOREIGN PATENT DOCUMENTS

| | | | |
|---|---|---|---|
| 4042129A1 | 7/1991 | Germany | H04Q 9/14 |
| 2275800 | 9/1994 | United Kingdom | G08C 23/00 |

OTHER PUBLICATIONS

Continuous Dialog with Audio and Video, Funkschau, Jan. 1991, pp. 53–55, Germany.

Audio and Video in Home Networks, Funkschau Jun. 1991, pp. 74–79, Germany.

Tomohiro Hase, Morimasa Matsuda, A New Audio–Visual Control Using Message Object Transmission, Abstract, IEE Transactions on Consumer Electronics, vol. 40, No. 4, Nov. 1994.

*Primary Examiner*—Edwin C. Holloway, III
*Attorney, Agent, or Firm*—Joseph S. Tripoli; Peter M. Emanuel; Paul P. Kiel

[57] ABSTRACT

A method for the remote control of at least one electronic device (10 to 25) is proposed in which the control data are transmitted from a remote control device (27) to the electronic device (10 to 25). In the method, information data at least regarding the remote control functions of the electronic device (10 to 25) to be controlled are transmitted to the remote control device (27). These information data are stored in the remote control device (27) and called on during a control operation in order to select and transmit the control data necessary for the respective control operation. At least the device identification number (GID) and the device type are transmitted to the remote control automatically, for example after the connection of the electronic device to the power supply system.

Furthermore, an apparatus for the remote control of an electronic device is proposed, as well as an electronic device.

9 Claims, 9 Drawing Sheets

APPARATUS FOR THE REMOTE CONTROL OF ELECTRONIC DEVICES WITH KEY ALLOCATION

The invention relates to a method for the remote control of electronic devices, and apparatus for the remote control of electronic devices, and also an electronic device.

PRIOR ART

The invention is based on a method for the remote control of electronic devices of the generic type as specified in the. A method for the remote control of electronic devices has already been disclosed in U.S. Pat. No. 5,282,028. It is known from this to design a remote control in such a way that a variety of devices can be controlled by it. Specifically, a digital music tuner and a so-called set-top box are controlled with the aid of the remote control. At the same time, data transmission is possible issuing both from the remote control to one of the electronic devices, and from an electronic device to the remote control. Data regarding the receivable programmes can be transmitted from the digital music tuner to the remote control with the aid of a corresponding communications protocol. These data are then displayed on a display unit of the remote control. As regards the remote control, mention is made of the fact that it contains a programmed memory, in which information data regarding the remote control functions of a large number of different devices are stored. Each of these devices can have a separate communications protocol in accordance with which it can be remotely controlled. Since a multiplicity of devices of different types are commercially available, the memory in the remote control must contain a multiplicity of different communications protocols for the respective device types.

DE-P-37 10 218 discloses a remote control which has a key function and display memory for temporarily storing the key function display information items transmitted by the devices to be controlled. Consequently, it is not necessary to modify the remote control when new devices to be controlled are added to the equipment base. In the case of the remote control described here, a general device code is first transmitted for the control of a device. All of the active devices thereupon transmit their device identifier after predetermined times. All of the available devices are displayed on the display of the remote control. The user selects one of the devices. Following reception of the associated device identifier, the device transmits its possible control functions. The control of the device can thereupon be carried out in accordance with the functions displayed on the remote control.

INVENTION

The object of the invention is to specify a method and an apparatus for the remote control of electronic devices, which method and apparatus are capable of controlling a multiplicity of electronic devices, the intention being that electronic devices produced in the future will also be able to be controlled in a simple manner by means of the remote control.

The method according to the invention has the advantage that the information data regarding the remote control functions of an electronic device do not have to be stored from the outset in the memory of the remote control. These data are transmitted from the electronic device to the remote control. The remote control stores these data in its memory and can thus in future control the electronic device. Practically an automatic reconfiguration of the equipment base to be controlled takes place in that whenever a device is connected for the first time to the power supply system, it transmits at least its device identification number and the device type.

Advantageous developments and improvements of the inventive method are specified in the claims. It is thus advantageous if, in addition to the information data regarding the remote control functions of the electronic device, information data regarding the input and output possibilities of the electronic device are also transmitted to the remote control. In this way, multimedia applications such as, for example, transferring music from a video tape to a stereo cassette are then also very easily possible. Another example is constituted by the uniting of devices which have previously belonged to different disciplines, such as conducting a telephone call via the stereo system, for example. If, for example, a telephone call arrives, then it is possible to inform the remote control of this and, on the basis of the communicated input/output information items, it is possible to insert on the display of the remote control the option of outputting the call via the stereo system. The user switches the current radio programme off by means of the remote control and diverts the telephone call to the stereo system.

For an apparatus for the remote control of an electronic device, it is very advantageous if symbols assigned to the received information data are displayed on the display unit of the remote control. In this way, the control of a device newly integrated into the system is then very simply configured for the user. In a special refinement, the display unit of the remote control can be designed as a touch-sensitive display unit. Only the symbols assigned to the control functions then need to be displayed on this display unit. The operator can then initiate a corresponding function simply by touching the symbol.

It is likewise advantageous if the remote control has an additional interrogation key, the actuation of which results in the transmission of an interrogation code with which the at least one electronic device is requested to communicate its information data regarding the remote control functions. In that case, it is also very advantageous if, following the actuation of this interrogation key, a remote control type code is transmitted in addition to the interrogation code. With the aid of this remote control type code, the remote control then informs the electronic device of the version of the remote control and, therefore, also of which display possibilities the remote control has available. Accordingly, the electronic device can transmit either only specific function codes or entire graphical information items to the remote control.

For an electronic device, it is particularly advantageous that it has a memory in which information data regarding the remote control functions of the electronic device are stored, and that it has means which automatically transmit at least some (see above) of these information data, in particular after connection to a power supply system.

It is also very advantageous if the electronic device contains information data regarding its input and output possibilities in its memory and transmits these data in addition to the information data regarding the remote control functions. The multimedia applications which have already been mentioned above are then made possible as a result of this.

It is furthermore advantageous if each individual device to be controlled has an identification number via which it can be addressed separately. This avoids incorrect functions when individual devices have partly identical control functions.

It is likewise advantageous that the electronic device has stored at least one further record of information data regarding its remote control functions in the memory, the further record of information data being provided for another remote control type. It then becomes possible for the device to offer different types of user guidance depending on the remote control used. This additionally achieves a divorce from the technical progress, for example in display technology.

DRAWINGS

An exemplary embodiment of the invention is explained in more detail in the following description and is illustrated in the drawings, in which.

DESCRIPTION OF THE INVENTION

Figure 1:
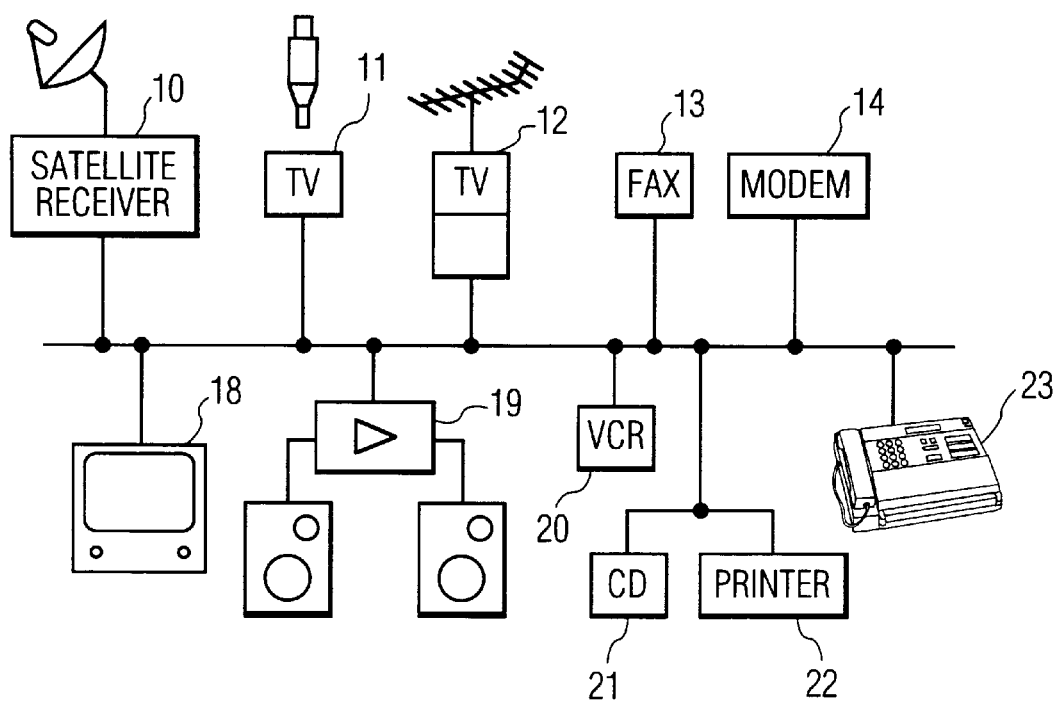
FIG. 1 shows an interconnection of a plurality of electronic devices with the aid of a data transmission channel.

FIG. 1 illustrates a wide variety of terminals which are connected to one another via a digital data transmission channel. The reference number 10 designates a satellite receiver. The reference number 11 designates a television set which is connected to the broadband cable network. The reference number 12 designates a television set which is connected to a house aerial. The reference number 13 designates a fax machine. The reference number 14 designates a modem. The reference number 15 designates a radio device which is equipped with a wire aerial. The reference number 16 designates a radio device which is likewise connected to the broadband cable network. The reference number 17 designates a radio device which is connected to a house aerial. The reference number 18 designates a third television set in the house. The reference number 19 designates the amplifier of a stereo system. The reference number 20 designates a video recorder. The reference number 21 designates a CD player (CD in this case stands for Compact Disc). The reference number 22 designates a printer. The reference number 23 designates a telephone apparatus. The reference number 24 designates a fourth television set. The reference number 25 designates a computer. The reference number 26 designates the digital data transmission channel. Also connected to the latter, finally, is a remote control device 27. The devices illustrated can be provided, for example, in a house. The data transmission channel 26 is at least partly of a wire-free design. All of the devices 10 to 25 illustrated can be remotely controlled by the remote control device 27.

Since, following the introduction of digital signal processing, in the meantime all of the devices 10 to 25 illustrated can be obtained as digitally operating devices, all of these devices can exchange data via the digital transmission channel. The delimitation of the individual devices is thus largely eliminated. An equipment interconnection, which is also designated by the term multimedia interconnection, is produced.

Figure 2:
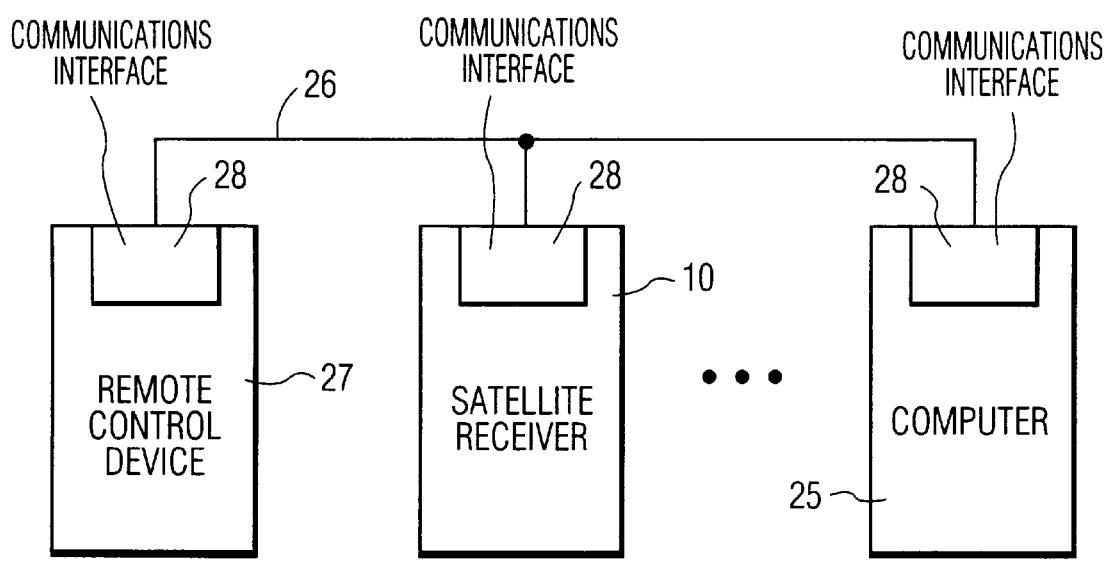
FIG. 2 shows a rough block diagram showing the connection of the electronic devices to the transmission channel.

FIG. 2 diagrammatically illustrates the same equipment interconnection as in FIG. 1. In FIG. 2, identical reference numbers designate the same components as in FIG. 1. These reference numbers are therefore not explained again. The reference number 28 designates a communications interface. Each of the devices illustrated in FIG. 2 contains a communications interface 28 of this type. Communications interfaces 28 of this type have been sufficiently disclosed in the prior art. Reference is made in this respect to the serial interface designated RS232, or else an IIC bus interface (Inter-Integrated Circuit) or a CAN bus interface (Controller Area Network), which enjoy widespread application in computer technology. The communications interface 28 contains circuits which realize a defined data transmission protocol. Such a transmission protocol can also be realized with the aid of programming measures and a microcomputer.

Figure 3:
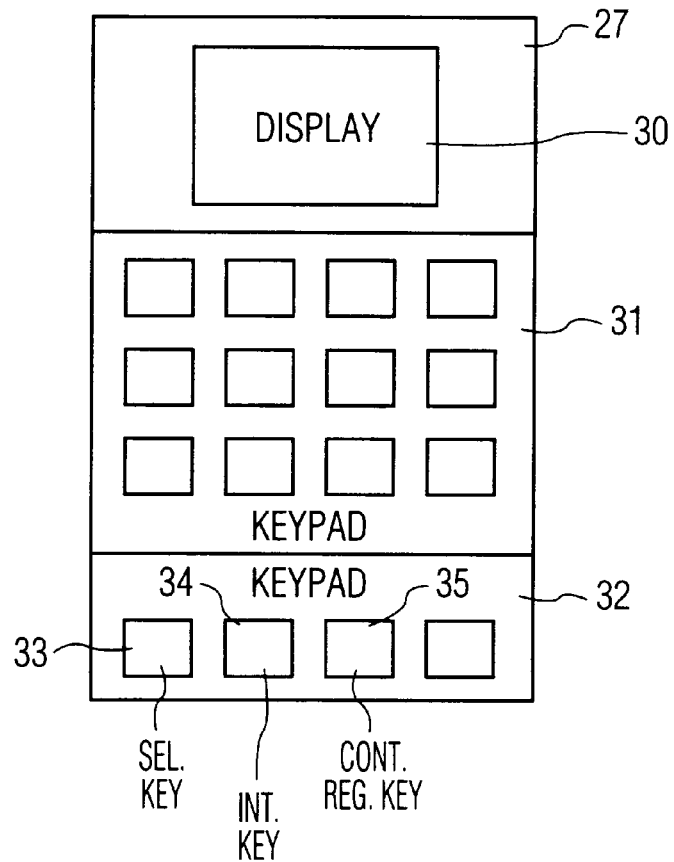
FIG. 3 shows a diagrammatic illustration of the external view of a remote control device.

The external view of the remote control 27 is illustrated in more detail, in FIG. 3. The reference number 30 designates the display unit of the remote control 27. The reference number 31 designates a keypad. The keypad 31 represents a freely programmable keypad. The reference number 32 designates a further keypad. The keys contained therein are fixed-programmed, they are each allocated a special function. The reference number 33 in this case designates a selection key. A device to be controlled is selected using this selection key. The selection key 33 can be actuated repeatedly. Each time this selection key 33 is actuated, a symbol of a different controllable device is displayed on the display unit 30. The reference number 34 designates an interrogation key. The information data of the controllable devices can be interrogated with the aid of this interrogation key 34. This key is actuated whenever another further device is to be added to the equipment interconnection illustrated in FIG. 2. The interrogation operation will be explained in more detail below.

The reference number 35 designates a control request key. This key is actuated when the desired device to be controlled has been selected using the selection key 33. By pressing the control request key 35, a control request code is then communicated to the device to be controlled. Using this code, the corresponding device recognizes that it is to be subsequently controlled, and, as a response to this code, it communicates its specific information data relating to its control functions. This operation, too, will be explained in more detail below.

It is possible to provide even further fixed-programmed keys in the keypad 32.

Figure 4:
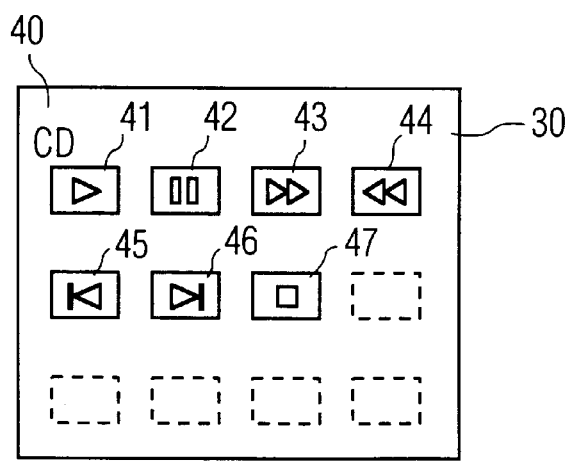
FIG. 4 shows the display of the possible remote control functions of a CD player on the display unit of the remote control device.

FIG. 4 now shows an image which is displayed on the display unit 30 and is provided for the remote control of a CD player. The CD symbol 40 indicates that the displayed image is applicable to the remote control of a CD player. The reference number 41 designates a playback symbol. The reference number 42 designates a pause symbol. The reference number 43 designates a symbol for a fast forward run and the reference number 44 designates a symbol for a fast reverse run. The reference number 45 designates a forward skip symbol and the reference number 46 designates a reverse skip symbol. Finally, the reference number 47 designates a stop symbol. The said symbols 41 to 47 each indicate to the user a possible control function of the CD player. It goes without saying that even further symbols for further functions of a CD player could be provided here. The arrangement of the symbols 41 to 47 is such that it coincides with the arrangement of the keys in the freely programmable keypad 31. The arrangement of the playback symbol in the top left corner of the display unit 30 informs the user of the remote control 27, for example, of the fact that by pressing the top left key in the freely programmable keypad 31 he is activating the playback function of the CD player. The same applies correspondingly to the illustrated symbols 41 to 47.

Figure 5:
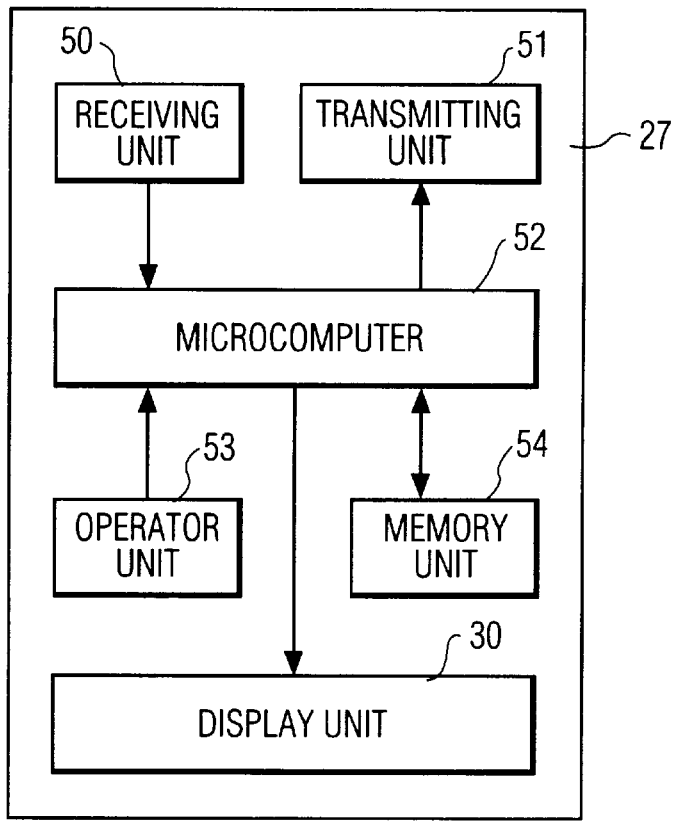
FIG. 5 shows a rough block diagram of the remote control device.

FIG. 5 illustrates a block diagram of the remote control 27. The reference number 50 designates a receiving circuit. Receiving circuits of this type have been sufficiently disclosed in the prior art. The receiving circuit is one for infrared radiation. The receiving circuit 50 is connected to a microcomputer 52. A transmitting circuit 51 is furthermore provided. The transmitting circuit, too, has been generally disclosed in the prior art. The transmitting circuit is likewise one for infrared radiation. The transmitting circuit 51 is also connected to the microcomputer 52. An operator unit 53 is furthermore provided. The keypads 31 and 32 are connected to the operator unit 53. The operator unit 53 is also connected to the microcomputer 52. Furthermore, a memory unit 54 is also provided. The microcomputer 52 has access to the memory unit 54 via a bidirectional bus. Finally, the display unit 30 is also illustrated. The display unit 30 is likewise connected to the microcomputer 52. The memory unit 54 is used as a data memory. The microcomputer 52 additionally has a programmed memory in which, as has been sufficiently disclosed in the prior art, the data transmission protocol already mentioned above is stored.

Figure 6:
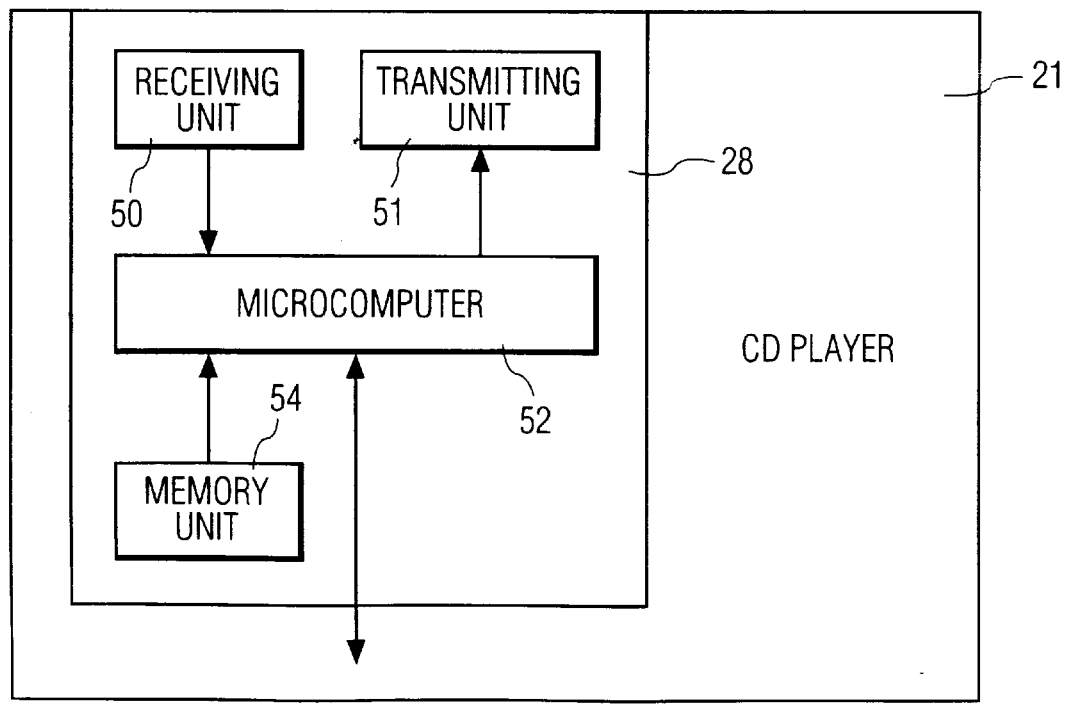
FIG. 6 shows a rough block diagram of an electronic device.

FIG. 6 now illustrates a block diagram of the CD player 21. In this case, however, only the part relating to the communications interface 28 is illustrated in more detail. The remaining parts of the CD player are well known from the prior art. The reference numbers in FIG. 6 correspond to the reference numbers in FIG. 5 and respectively designate the same components. It only remains to be mentioned, then, that a bidirectional bus issues from the microcomputer 52 and leads to the controller of the CD player.

Figure 7:
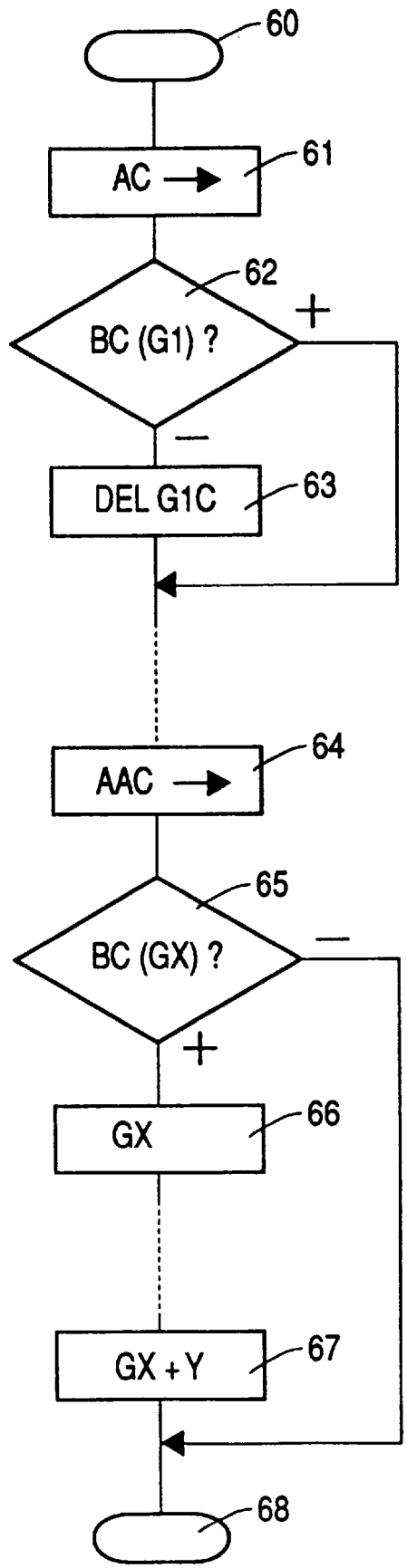
FIG. 7 shows a flow diagram for a program for a remote control device for the interrogation of the controllable devices.

The operation which proceeds in the remote control device 27 after the interrogation key 34 has been actuated is discussed in more detail below. This operation is illustrated in FIG. 7.

The reference number 60 designates the program start, which is initiated by the actuation of the interrogation key 34. An interrogation code is transmitted in the program step 61. The interrogation code is transmitted with an interrogation message.

Figure 11:
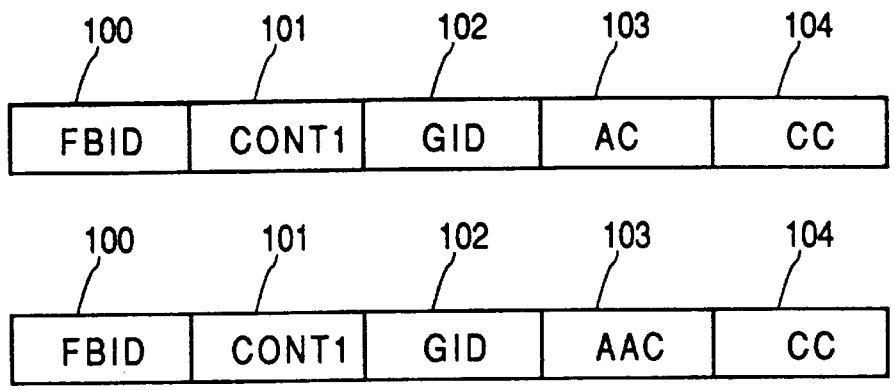
FIG. 11 shows the structure of an interrogation message which is transmitted from the remote control device.

The structure of the interrogation message is illustrated in FIG. 11. The start bit (not illustrated) is followed by a source address field 100 in which the identification number of the remote control is entered as the source address. The source address field 100 is followed by a control field 101. The manner in which the message is to be evaluated is defined in this control field 101, by the code which is entered here. The control field 101 thus determines the structure of the following fields, in particular the length and meaning thereof. The control field 101 is followed by a destination address field 102. An identification number of an electronic device whose information data has already been read in during an earlier interrogation operation is entered into this field. The destination address field 102 is then followed by a data field 103. An interrogation code is stored in the latter. The device which receives the interrogation message is thus informed that an interrogation operation is taking place and that it has to react accordingly. The data field 103 is then also followed by a check code field 104. There is stored in the latter a check sum which can be used to verify error-free transmission of the message. The last thing to follow is a stop bit, but it is not illustrated in FIG. 11.

The interrogation code transmitted in program step 61 is therefore intended for a specific electronic device and is accepted only by this electronic device. In the program step 62, the remote control waits for a readiness message of the device addressed. If this message is received within a predetermined time, the program is continued with program step 61, in which case, however, a further electronic device is then interrogated whose device code has already previously been entered in the memory of the remote control. If no corresponding acknowledgement message arrives at the remote control within the predetermined time in program step 62, the associated device code is removed from the list in the memory 54. This is done in program step 63. In the following program steps, interrogation messages are likewise communicated to the other external devices whose device codes have been entered in the list of devices to be controlled in the memory 54 of the remote control. After the last of the devices has communicated its readiness code, the transmission of a further interrogation message ensues in the program step 64.

The structure of this interrogation message is likewise illustrated in FIG. 11. This message has the same structure as the interrogation message explained above. The difference is that a general device code is entered in the destination address field 102. From this code, all of the external devices which have previously not identified an interrogation message addressed to them within a predetermined time recognize that they are being requested to transmit an acknowledgement message. They then immediately communicate their acknowledgement message to the remote control device 27. In the program step 65, therefore, the remote control device 27 waits for the arrival of a further acknowledgement message. When such a message arrives, the associated device code is likewise entered in the list of remotely controllable devices in the memory 54. This then takes place in program step 66. Should the situation arise where a plurality of devices simultaneously transmit their acknowledgement messages, then it must be ensured that incorrect functions do not occur. Therefore, each remotely controllable device whose device code has not yet been entered in the list of remotely controllable devices in the memory 54 of the remote control 27 generates a random number which determines the period of time after which the respective device transmits its acknowledgement message. In this way, data collisions are then avoided to the largest possible extent. After the last external device has transmitted its acknowledgement message in the program step 67, this section of the program is ended in the program step 68. If no more acknowledgement messages have been received by the remote control 27 after a predetermined maximum time in the program step 65, the program is ended directly with program step 68.

Figure 8:
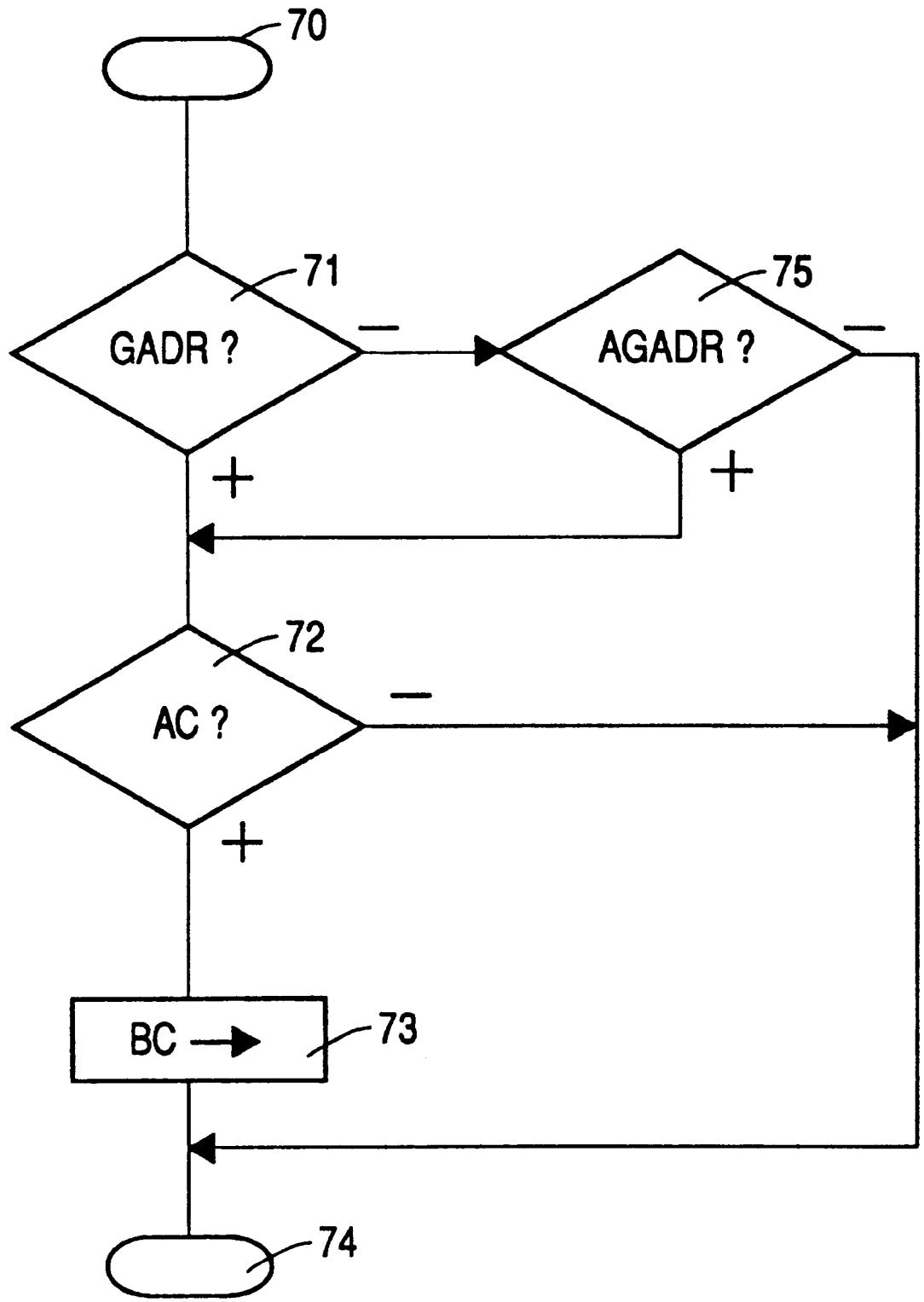
FIG. 8 shows a flow diagram for a program for an electronic device which is executed following the reception of an interrogation code.

FIG. 8 now shows the program sequence on the part of an electronic device 10 to 25, after it has received an interrogation message. The reference number 70 designates the program start. This is initiated by the reception of an interrogation message. In the program step 71, the received message is thoroughly checked to see whether it contains the address of this device in the destination address field 103. If this address is contained in the destination address field 103, an interrogation is effected in the program step 72 to see whether the data field 103 contains the interrogation code. If this is likewise the case, then an acknowledgement message is transmitted back to the remote control 27. This is then done in program step 73. After this, the program is ended in program step 74. If it was discovered in interrogation 71 that the associated device address is not entered in the destination address field 102, an interrogation is effected in the program step 75 to see whether a general device address is entered in the corresponding destination address field 102. If this is the case, the program is continued with program step 72. If this is not the case, the program is immediately ended in the program step 74.

Figure 12:
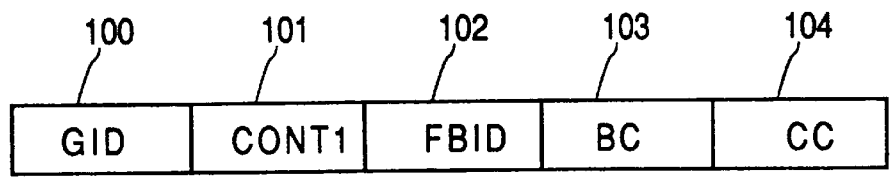
FIG. 12 shows the structure of an acknowledgement message which is transmitted from an electronic device following the reception of an interrogation message.

FIG. 12 shows the structure of an acknowledgement message. The structure is fundamentally the same as in FIG. 11. The same reference numbers designate the same as in FIG. 11. However, in an acknowledgement message, the device identification number is entered in the source address field 100. The identification number of the remote control is then entered as destination address in the destination address field 102.

Figure 9:
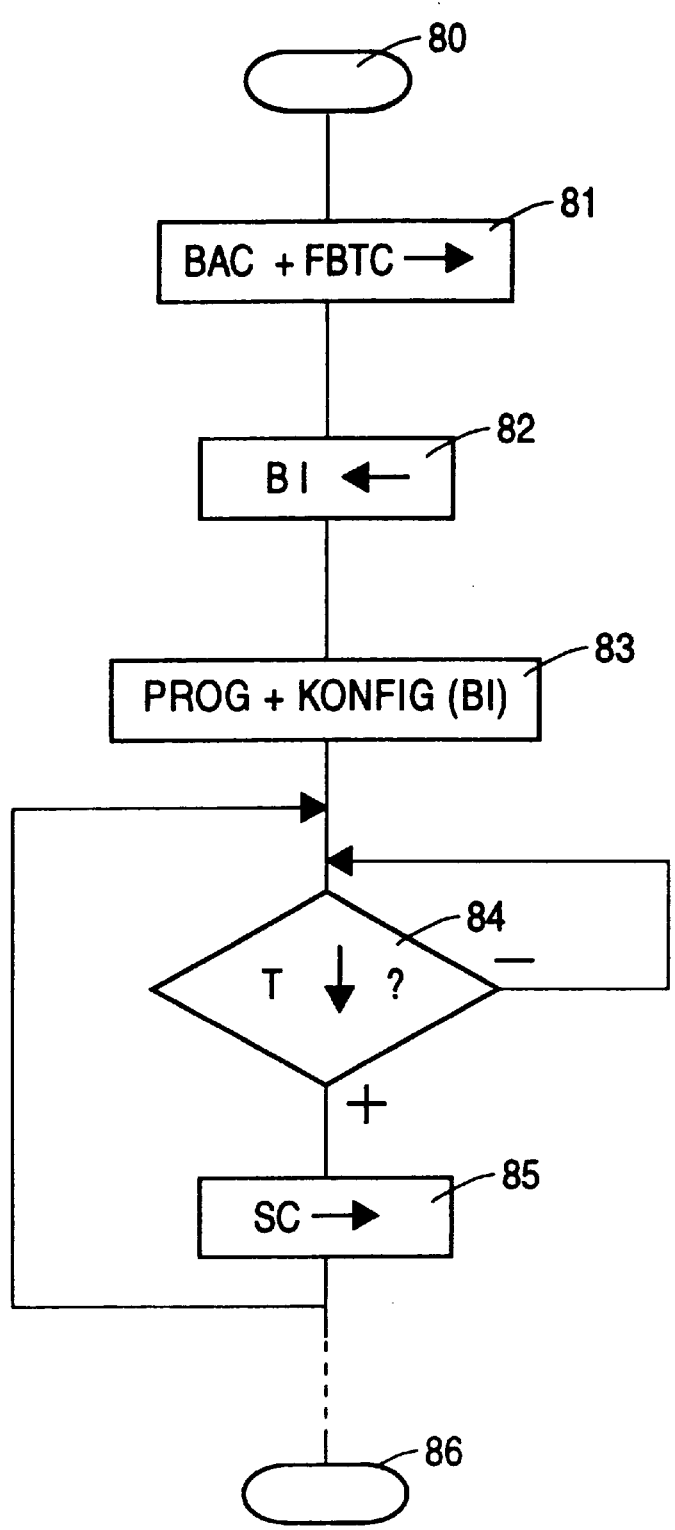
FIG. 9 shows a flow diagram for a program for a remote control device which is executed for the control request of an electronic device.
Figure 13:
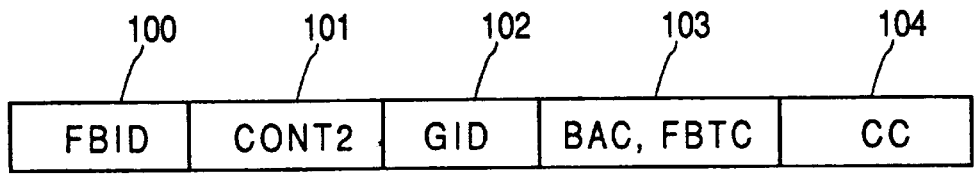
FIG. 13 shows the structure of a control request message which is transmitted from a remote control device.

FIG. 9 now illustrates a flow diagram for a program which is executed by the remote control device 27 following actuation of the control request key 35. The reference number 80 designates the program start. The reference number 81 then designates a program step in which a control request message is transmitted to the selected device. The structure of this control request message is illustrated in FIG. 13. The special feature of this message is that a remote control type code is additionally transmitted as well as the control request code in the data field 103. Since the data field 103 is longer in this case than in the preceding cases, a corresponding control code must also be entered in the control field 101. The identification number of the remote control is entered in the source address field 100 and the device identification number is entered in the destination address field 102. In the following program section 82, there is an evaluation of the control information message which is then transmitted from the addressed device to the remote control. The evaluation of the control information items transmitted with the information message then takes place in program step 83. In this case, the transmitted function codes and meaning codes are entered in the memory 54 of the remote control. The display is then also reconfigured in accordance with the received data, as illustrated in FIG. 4, for example. However, the program sections required for this have already been disclosed in the prior art and do not need to be explained again at this point. After this, the program waits in program step 84 for the actuation of a key of the keypad 31. When a key is actuated, the associated control code is transmitted to the electronic device in the program step 85. The program is then continued again with program step 84 until it is ended by the actuation of another function key.

Figure 10:
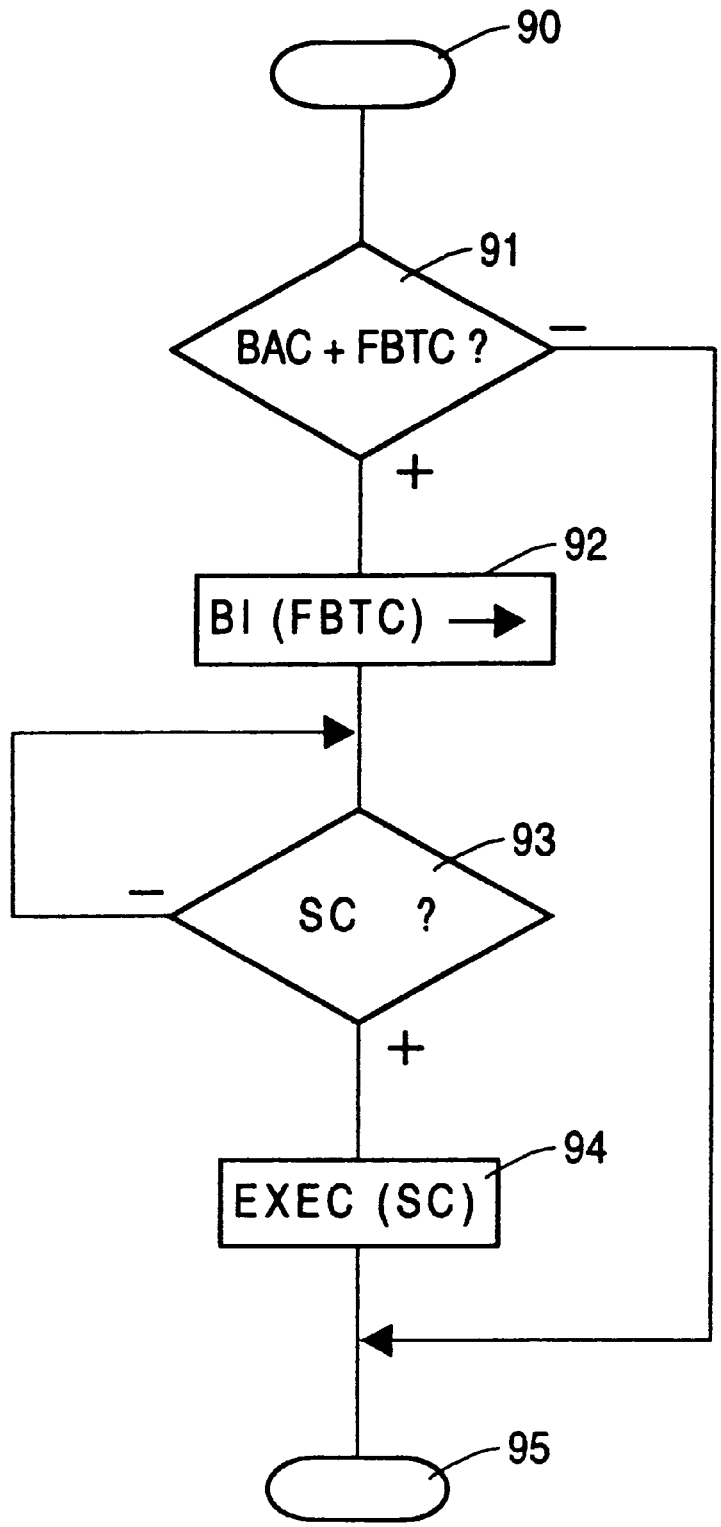
FIG. 10 shows a flow diagram for a program which is executed following the reception of a control request in an electronic device.

FIG. 10 now shows a flow diagram for an electronic device which has received the control request message. The program is started in the program step 90. In interrogation 91, a check is made to see whether the received control request message contains a control request code as well as a remote control type code and also the associated device identification number. If this is the case, the aforementioned information message is transmitted to the remote control device 27. This is then done in program step 92.

Figure 14:
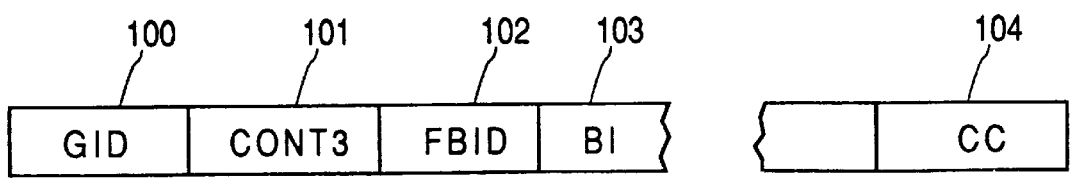
FIG. 14 shows the structure of an information message which is transmitted from an electronic device following the reception of a control request message.

The structure of the information message is illustrated in FIG. 14. The device identification number is entered in the source address field 100 of this message. The remote control identification number is entered in the destination address field 102 of this message. A control code for the information message is entered in the control field 101. The function codes and meaning codes of the remote control functions of the device are then successively entered in the data field 103 of this message. Information items regarding the input or output possibilities of the respective device may additionally be entered in the data field 103. Information items of this type are, for example in the case of a video recorder, the information that the device has the following inputs for audio information items: namely a stereo channel, a mono channel and an input for a five-channel Dolby Surround program. As regards the video information items, the input possibility specified may be the information "Input for video data" according to the PAL standard and/or according to the PAL Plus standard. The same details as for the input information can then be given as output information. For a television receiver, these input and output information items then have the following form, for example: as input possibilities, a mono input and a stereo input are made available for audio data. A PAL and/or PAL Plus input is made available as input possibility for video data. In this case, the same information items are then considered as output possibilities. Furthermore, the ability of the television receiver to decode teletext data is also considered as an output possibility.

After the control information items have been transmitted to the remote control, the program waits in interrogation 93 to see whether a control function message arrives. If this is the case, the function assigned to the corresponding control code is executed. This is then done in the program step 94. This program section is then ended in program step 95.

Figure 15:
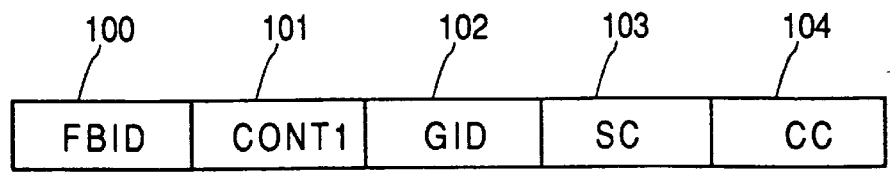
FIG. 15 shows the structure of a control function message which is transmitted from the remote control device.

FIG. 15 illustrates the structure of the control function message. The transmitted control code is entered in the data field 103. The identification number of the remote control is entered in the source address field 100. The device identification number is entered in the destination address field 102.

In the exemplary embodiment, it was assumed that a dedicated identification number is assigned to each remote control and also to each electronic device. Each individual device can be identified using this number. The numbers must be continually selected so that double allocations do not arise. One possible way of modifying this exemplary embodiment consists in giving specific type identification numbers to the various devices. It is thus possible, for example, to give the same identification number both to all the television sets of one type, and to the CD players of one type, or the remote controls of one type, etc. Should two identical devices then appear in a multimedia interconnection, then it would be possible to distinguish between them only with difficulty. This would then require all of the devices to transmit a name proposal in their acknowledgement message to the remote control. If the remote control then determines that such a name is already present in the memory, a different name would then automatically have to be selected and would then also have to be communicated to the device to be controlled in a separate message. Mix-ups can then be avoided in this way. Each device must then answer again in future under the respective name.

A wide variety of further modifications of the invention are possible. It is thus possible, for example, that a device newly added to the multimedia interconnection does not communicate its information data only upon interrogation on the part of the remote control, but rather automatically after it has been connected to the power supply system.

The information data do not necessarily have to be transmitted in a wire-free manner to the remote control device. If, for example, the individual devices of the equipment interconnection are accommodated in different rooms and all of the devices are connected to one another via a separate data network, the information data can also be transmitted to the remote control device via this data network. The remote control device must then likewise be connected to this data network. The power supply system can also be considered as a data network. The devices are connected to the said power supply system in any case. The remote control device must then likewise be connected to the power supply system. A telephone network or a radio network can also be used as a data network for transmitting the information items. As a result, the field of application is also extended to include remote control functions such as, for example, the switching on of an alarm system or of a heating installation, etc. with the aid of the remote control. To this end, the remote control can also be designed in such a way that it is of portable design, on the one hand, but also has an interface for data reception via the data network (power supply system) in order to receive the information data of a large number of devices which do not have an infrared transmitter. The remote control device is temporarily connected to the data network for this purpose. After it has received these data, it can control the devices in a wire-free manner if the devices are designed for this.

It is likewise possible for the individual devices 10 to 25 to exchange data between one another in accordance with the same communications protocol. Such data may be, for example, video data and audio data. However, the data may also be selected data, for example regarding the programming of a video recorder.

Instead of transmitting function codes and meaning codes to the remote control, only graphical data for driving the display unit 30 could also be transmitted. The individual data could then be bit map information items. These data could then be displayed on a touch-sensitive screen. The operator would then only have to touch the corresponding area of the screen in order to initiate a remote control operation. A voice output of the received data at the remote control would also be possible.

A further possible modification consists in the information data being transmitted to the remote control device as early as after the reception of the interrogation message. The remote control would then store these data immediately in the memory. A separate control request key would not then be necessary. However, a larger memory would be necessary.

Even the transmission only of individual, special information data regarding a few individual remote control functions to the remote control device still lies within the province of the invention.

We claim:

1. Apparatus comprising a memory having information data related to remote control signals stored therein, a transmitting circuit, a receiving circuit, a display unit, an operator unit and a control unit having means for writing information data received from electronic devices regarding respective remote control functions to the memory and for carrying out a corresponding key allocation on the operator unit, the control unit, in response to the actuation of an interrogation key, transmitting an interrogation code requesting information data related to remote control signals and a remote control type code giving information about the display possibilities of the display unit.

2. Apparatus according to claim 1, wherein the apparatus has an associated identification number and further comprises comparison means for comparing the associated identification number with an identification number contained in a received communications message.

3. Apparatus according to claim 1, wherein the display unit is a touch-sensitive screen.

4. Apparatus according to claim 1, wherein upon actuation of a control key, the control unit assigns a control code in accordance with its current key allocation.

5. Remote control system, comprising:
    an electronic device having a first memory, a first transmitting circuit, a first receiving circuit and a first control circuit; and
    a remote control device comprising a second memory having information data related to remote control signals stored therein, a second transmitting circuit, a second receiving circuit, a display unit, an operator unit and a second control unit having means for writing information data received from the electronic device regarding respective remote control functions to the second memory and for carrying out a corresponding key allocation on the operator unit, the control unit, in response to the actuation of an interrogation key, transmitting an interrogation code requesting information data related to remote control signals and a remote control type code giving information about the display possibilities of the display unit,
    the electronic device transmitting function codes and graphical information items in response to the remote control type code.

6. The remote control system according to claim 5, wherein the display unit comprises a touch sensitive screen.

7. The remote control system according to claim 5, wherein the electronic device transmits a device identification data when the electronic device is connected to a power source.

8. The remote control system according to claim 5, wherein the remote control device has an associated identification number and further comprises comparison means for comparing the associated identification number with an identification number contained in a received communications message.

9. The remote control system according to claim 8, further comprising a second remote control device, the second remote control device having a second associated identification number and further comprises a second comparison means for comparing the second associated identification number with the identification number contained in the received communications message.

* * * * *